Sept. 22, 1953     A. C. HENSLEY     2,652,936
SELF-LOADING TRUCK
Filed June 22, 1948     3 Sheets-Sheet 1
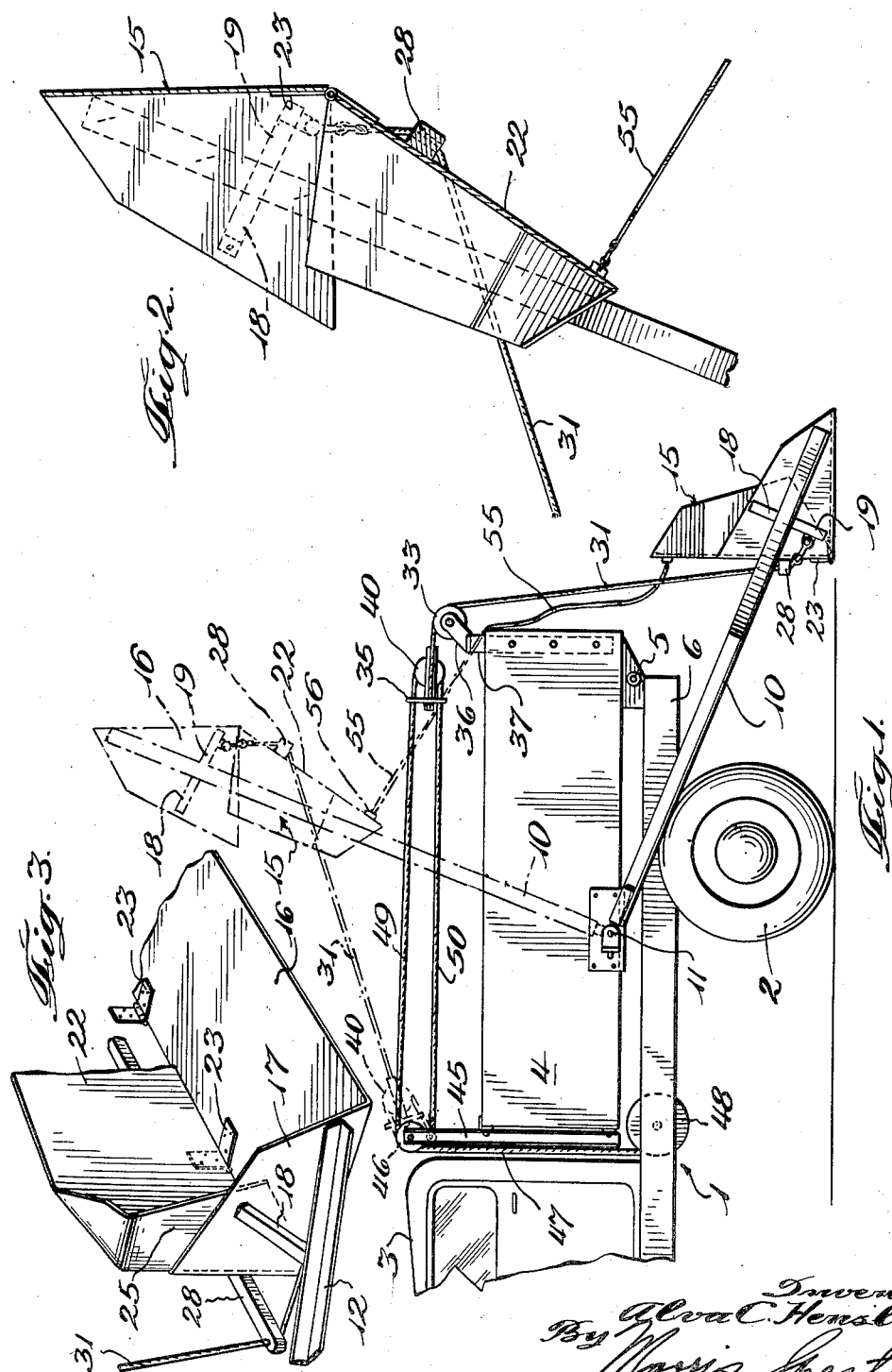

Sept. 22, 1953  A. C. HENSLEY  2,652,936
SELF-LOADING TRUCK
Filed June 22, 1948  3 Sheets-Sheet 2

Inventor
Alva C. Hensley
By Morris Spector
Attorney

Sept. 22, 1953 A. C. HENSLEY 2,652,936
SELF-LOADING TRUCK
Filed June 22, 1948 3 Sheets-Sheet 3
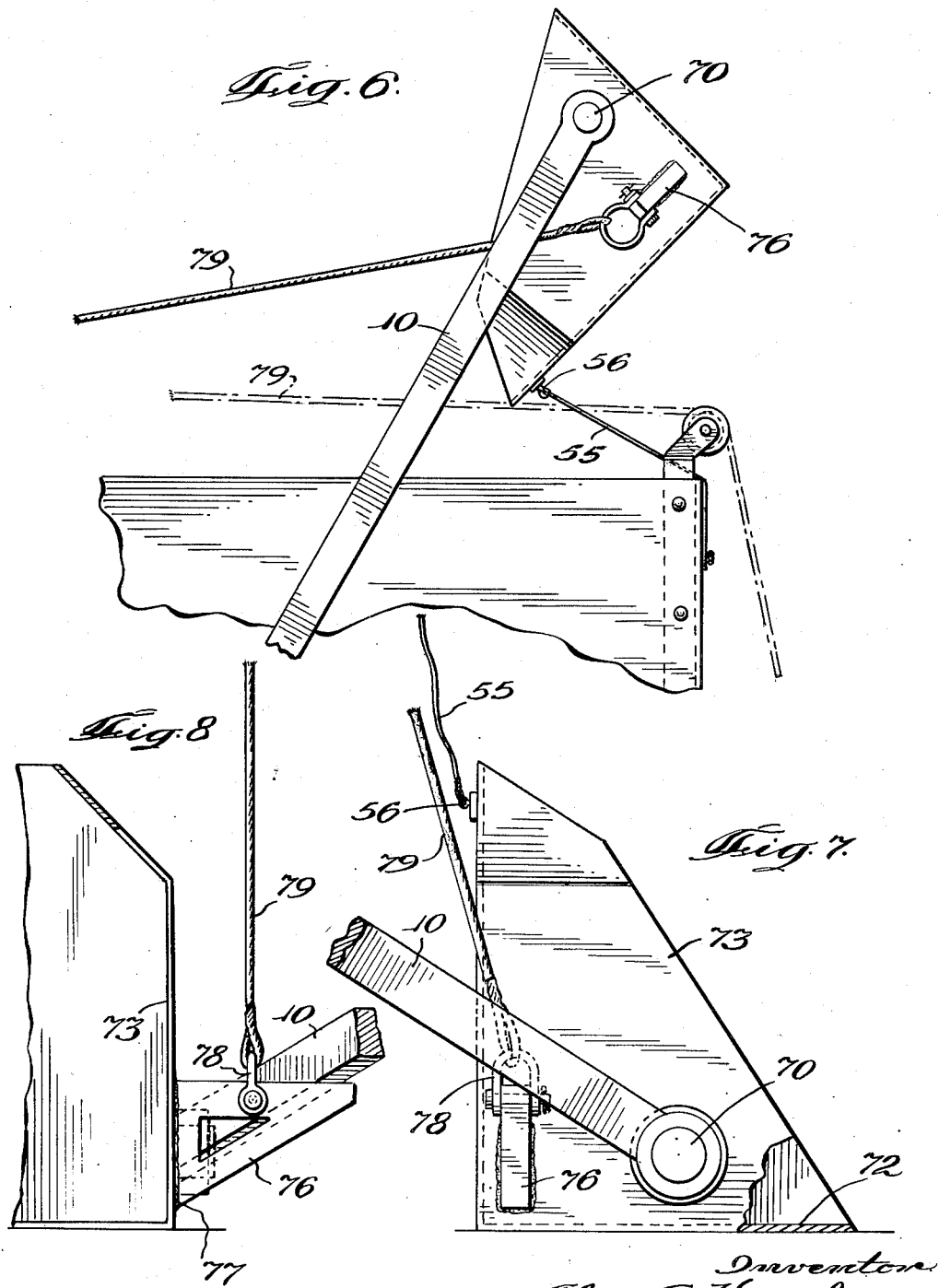
Inventor
Alva C. Hensley
By Morris Spector
attorney Patented Sept. 22, 1953

2,652,936

UNITED STATES PATENT OFFICE 2,652,936

SELF-LOADING TRUCK

Alva C. Hensley, Maroa, Ill., assignor to James D. Whitson, Decatur, Ill., as trustee Application June 22, 1948, Serial No. 34,523

8 Claims. (Cl. 214—78)

This invention relates to self-loading trucks and, more particularly, to scoop loading means for the truck.

The present invention is applicable to the common type of automobile dump trucks either as a part of the initially built truck structure or as an attachment to be permanently or removably attached to a truck. In its more specific aspects the present invention consists of a shovel type scoop and the means for raising and lowering the same.

It is one of the objects of the present invention to provide a shovel type scoop with raising means so arranged that the cable which raises the same cooperates with another cable when the scoop is in a proper position above the truck, to assure a gradual tilting of the scoop and gradual dumping of the contents thereof into the truck as the scoop support is further raised. It is a still further object of the present invention to provide a structure of the above mentioned character wherein the cable that controls the raising and lowering of the scoop is effective to force the scoop to return to its initial scooping position as the scoop is lowered. It is a still further object of the present invention to provide a scoop hoisting mechanism which can be used alike with a one piece tilting scoop or with a two piece scoop of which one piece is a tilting mechanism.

The attainment of the above and further objects of the present invention will be apparent from the following specification taken in conjunction with the accompanying drawings forming a part thereof.

In the drawings:

Figure 1 is a side view of a dumping truck on which a loading shovel of the present invention has been mounted;

Figure 2 is an enlarged sectional view showing the shovel in its dumping position;

Figure 3 is a fragmentary perspective view of the shovel in its lowered position;

Figure 6 is a fragmentary view illustrating the shovel or bucket of Figure 5 in its truck loading position;

Figure 7 is a side view of the structure of Figure 5 in its lowered position; and Figure 8 is a fragmentary rear view of the structure of Figure 7.

Reference may now be had more particularly to the drawings wherein like reference numerals designate like parts throughout.

Figures 4, 5:
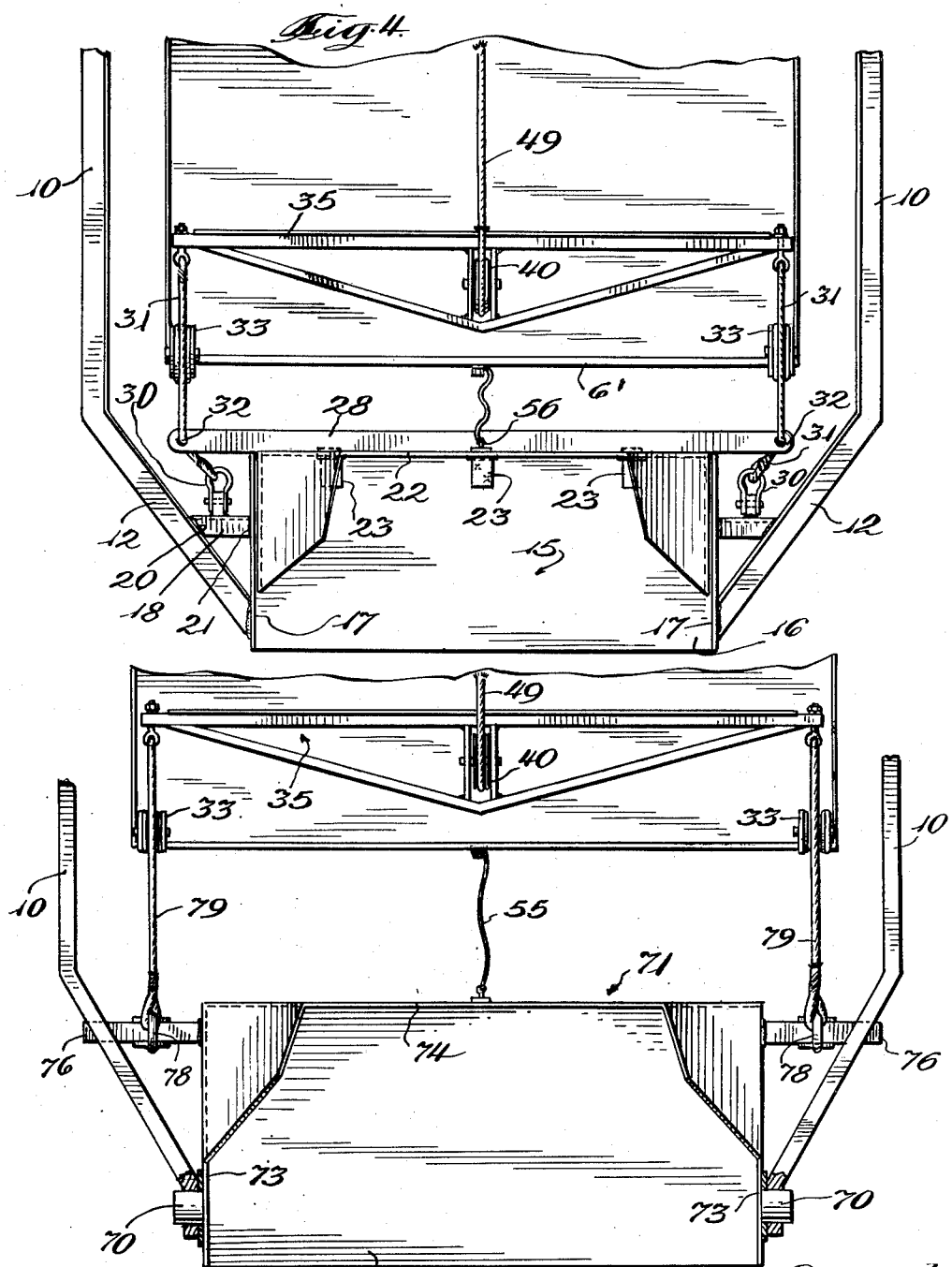
Figure 4 is a top view of the rear end of a truck embodying the present invention.
Figure 5 is a view corresponding to Figure 4 and illustrating a modified construction.

In Figure 1 there is shown at 1 an automobile truck having rear driving wheels 2, a control cab 3 and an automobile dumping body 4 pivoted at 5 on sills 6 of the automobile, in the manner usual in the art, so that the dumping body may be swung about the pivot 5 in a direction counterclockwise, as seen in Figure 1, to dump the contents of the dumping body 4 as is usual. The usual power means may be provided for swinging the dumping body to its dumping position. The dumping body has the usual type of tail gate 6' pivoted at the top of the gate at the upper rear corners of the dumping body to facilitate dumping the contents of the dumping body 4.

A pair of substantially identical side arms 10—10 are pivoted to the dumping body 4 on opposite sides thereof to swing about horizontally aligned pins forming a horizontal transverse pivot axis 11 which is located a substantial distance forward of the rear end of the truck body 4. Each side arm 10 extends rearwardly of the truck body, and has a rearmost portion 12 bent at an angle to the main part of the arm to extend towards the longitudinal center of the truck. A two piece scoop-type load gathering bucket 15 is mounted on the rearmost portions 12. The bucket includes a bottom 16 that has integral therewith a pair of upstanding sides 17—17. Each side 17—17 is welded or otherwise rigidly secured to the rearmost arm portions 12 and is further supported from the rearmost portions 12 by a pair of struts 18—19 which are secured together in V formation, with the apex of the V welded to the rearmost portion 12, as indicated at 20, and with the upper and lower arms of the V welded at 21 to the sides 17. The shovel 15 includes also a shovel back stop portion 22 that is hinged to the bottom portion 15 by a set of hinges 23. The back has integrally formed therewith a pair of wings 25 that slidingly engage the inner surfaces of the upstanding sides 17 of the bottom portion. A bucket closing and cable spreading bar 28 is welded to the back stop portion 22. This bar is of a length greater than the width of the shovel 15 and approximately equal to the width of the truck body 4.

A hoisting cable receiving eye 30 is secured to each strut 19 on opposite sides of the load gathering bucket 15, and each has the end of a cable 31 secured thereto. Each cable 31—31 extends loosely through an eye 32 in the bar 28 and around an idler pulley 33 to a trussed cross bar 35 to which it is secured. Each idler pulley 33 is mounted on an arm 36 at the upper end of a steel bar 37 that is bolted or otherwise rigidly secured on the inside of the dumping truck body 4 at each end of the opposite rear corners thereof immediately forward of the usual dumping body tail gate 6.

The trussed cross bar 35 supports at the center thereof a sheaved pulley 40.

At the forward end of the dumping truck body 4, at the center thereof, there is rigidly mounted an upright post 45 (Fig. 1) which carries a pulley 46 at its upper end. A load hoisting cable 47 extends from a power driven hoisting drum 48, over the top of the pulley 46, thence along the path 49, around the pulley 40, thence along the path 50 to the post 45 to which the end of the hoisting cable is rigidly secured. It is thus apparent that upon winding of the cable 47 onto the hoisting drum the trussed cross bar 35 will be drawn from the position indicated in full lines in Figure 2 at the rear of the truck body 4, towards the dotted line position at the forward end of the truck body. The truss bar 35 draws the hoisting cables 31 with it, and thus raises the arms 10 and the bucket 15 towards the dotted line position of the side arms 10.

A bucket unloading cord or cable 55 is secured at one end to the top of the tail gate 6, at the center thereof, and is secured at its opposite end to the shovel back portion 22 at 56. As the side arms 10 approach the position illustrated in dotted lines in Figure 1 and before they reach that position the cable 55 is drawn taut. As the hoisting cable 47 is further drawn in and the arms 10 are moved further towards the position illustrated in dotted lines in Figure 1, the end 56 is held by the cable 55 against further movement forward of the automobile truck body so that the continued movement of the arms 10 in a counter-clockwise direction towards the dotted line position of Figure 1 results in a swinging of the shovel back portion 22 with respect to the shovel bottom portion 16 about the hinges 23, thus bringing the back stop portion to its unloaded position, illustrated in dotted lines in Figure 1, where the contents of the scoop or shovel will slide by gravity down the back stop portion 22 into the dumping truck body 4. Later when the hoisting drum 48 is turned in the opposite direction to pay out the cable 47, the arms 10 start returning from the dotted line position of Figure 1 towards the full line position. Upon the commencement of this movement the shovel portion 16, of course, moves as a rigid body with the arms 10. As the tension on the cable 55 is released, the cable 31 acting on the cross bar 28 forces the back 22 to swing at its hinges 23 towards the shovel closed position so that as the shovel moves towards its lowered position the lifting cables 31 are effective to force the back 22 of the shovel to return to its normal closed position.

Filling of the load gathering bucket may be obtained by lowering the bucket until it is in engagement with the ground and then backing the truck into a load of gravel, clay or the like. As the bucket is forced into the load the bucket fills and ultimately further backing of the truck into the load causes the load in the bucket to exert a force tending to swing the back stop portion 22 of the shovel about the centers of the hinges 23 towards an unloading position. This swinging movement is itself resisted by the cable 31 which is secured to the strut 19 that is part of the bottom portion 16 of the shovel and which cable extends through the eyes in the spreader bar 28 that is welded to the shovel back stop portion. As long as the cable 31 is taut the shovel back stop portion 22 cannot swing towards its dumping position without causing a raising of the shovel.

In Figures 5, 6, 7 and 8 I have shown the principles of the present invention applied to a shovel or bucket of the type wherein the back is rigid with respect to the shovel portion, that is, to an arrangement wherein the hinges 23 of the load gathering bucket previously described have been omitted. In this structure the side arms 10 are pivoted to the truck body as previously described, and are each provided at their ends with an opening which constitutes a bearing for a cylindrical stud 70 secured to a load gathering bucket 71. The two studs 70 are in axial alignment and are journalled in the arms 10. The bucket 71 includes a bottom 72, side walls 73—73 and a back 74, all welded together into one rigid structure. The studs 70 are welded to the sides 73. Triangular struts 76 are welded to the outer sides of each of the sides 73 as, for instance, by a line of welding 77. Each of these struts has a hoisting cable receiving eye 78 pivoted thereto for receiving a hoisting cable 79, which corresponds to the hoisting cable 31 of the embodiment previously described. The hoisting cable 79 extends along the pulleys 33, as before, and are each secured to an eye on the trussed cross bar 35 that carries the pulley 40, as before, which pulley 40 has a hoisting cable wrapped therearound in the manner previously described.

When the load gathering bucket is in its lowermost position, which is the position illustrated in Figures 5, 7 and 8, the truck may be backed into a load of sand, gravel, dirt, or the like and cause the bucket to gather some of the load. When the cable 79 is hoisted it raises the bucket. The struts 76 to which the cables 79 are connected and which are welded to the sides 73 of the bucket abut the bottoms of the side arms 10 and cause the side arms to rise with the bucket. When the eye 56 of the bucket reaches a position such that the cable 55 becomes taut, further hoisting of the bucket or pulling in on the hoisting cables 47 (Fig. 1), that is, further pulling in on the cable 79 of Figure 6 to the left as seen in Figure 6 causes the bucket to swing in a direction counter-clockwise as seen in Figure 6, about the eye 56 as a somewhat shifting center, and thus causes the arms 10 to tilt the bucket to its unloading position as the studs 70 swing in an arc of a circle about the center of which the arms 10 pivot. Thus the hoisting cable 79 together with the cable 55 cause positive turning of the load gathering bucket, about the studs 70 to its unloading position of Figure 6. When the cable 79 is let out from the position illustrated in Figure 6 preparatory to lowering of the load gathering bucket the weight of the bucket causes the arms 10 to lower and as the arms lower the gravitational forces act to urge the bucket towards the arms 10 until the members 76 engage the arms 10, whereupon further paying out of the cable 79 results merely in lowering of the bucket and the arms 10 as a unit.

From the above description it is apparent that the structure which I have shown can readily be connected to existing dumping type trucks without requiring appreciable changes in the truck body. To effect this result it is only necessary to provide the arms 10 with the associated bucket and the means for mounting the same on the truck and the means for hoisting it.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A loading device for vehicles comprising a bucket, side arms pivoted to the vehicle and on which arms the bucket is mounted, said bucket including a shovel portion and a load back stop portion, at least one of which said portions is pivoted with respect to the arms for unloading the bucket, means for restraining pivotal movement of said one portion with respect to the arms and urging the said one portion from its unloading position, said means comprising a hoisting cord for swinging the arms and hoisting the bucket, and means for forcing pivotal movement of said one portion with respect to the arms, said second named means comprising a cord secured to the pivoted portion of the bucket and to the vehicle at a point spaced from the pivot center of said arms and drawn taut by the swinging of said arms.

2. A loading device for vehicles comprising a bucket, side arms pivoted to the vehicle and on which arms the bucket is mounted, said bucket including a shovel portion and a load back stop portion, at least one of which said portions is pivoted with respect to the arms, means for restraining pivotal movement of said one portion with respect to the arms during the bucket loading operation, and means responsive to a predetermined elevation of the bucket for causing pivoting movement of said one portion with respect to the arms, said first named means comprising a hoisting cord for swinging the arms and hoisting the bucket, and said second named means comprising a cord secured to the pivoted portion of the bucket and to the vehicle at a point spaced from the pivot center of said arms and drawn taut by the swinging of said arms.

3. In combination with a motor truck, a truck loading structure including, a pair of side arms pivoted to the truck and extending rearwardly thereof, a load gathering bucket at the end of the arms, said bucket being swingable by the arms from a bucket loading position adjacent the ground to a bucket unloading position above the truck, at least a portion of the bucket being pivoted for movement with respect to the arms from a bucket loading position to a bucket unloading position, a hoisting cord for swinging the arms to the bucket unloading position, said hoisting cord being arranged to force the pivoted portion of the bucket towards its bucket loading position with respect to the arms as the hoisting cord is pulled to hoist the bucket, and means responsive to a predetermined movement of the bucket for swinging the pivoted portion of the bucket towards its bucket unloading position against said closing force of the hoisting cord thereby causing gravity unloading of the bucket and whereby upon reverse movement of the side arms to force of the hoisting cord is again effective to force the pivoted portion of the bucket to its bucket loading position with respect to the arms.

4. In combination with a motor truck, a pair of side arms on opposite sides of the truck and pivoted to the truck to swing about an axis extending transversely thereof, a scoop type load gathering bucket on the end of the arms, said bucket including a bottom portion and a back portion, at least one of said portions being pivoted with respect to the arms for moving from a bucket loading to a bucket unloading position with respect to the arms, and means for raising the arms to raise the bucket to its unloading position, said arm raising means including a pulley and cable system, said cable system including a hoisting cable secured at one end to raise the arms and having a portion of the cable which is spaced from said end bearing against said pivoted portion of the bucket and exerting a force urging said pivoted portion of the bucket towards its bucket loading position as the arms are being hoisted.

5. In combination with a motor truck, a pair of side arms on opposite sides of the truck and pivoted to the truck to swing about an axis extending transversely thereof, a scoop type load gathering bucket on the end of the arms, said bucket including a bottom portion and a back portion, at least one of said portions being pivoted with respect to the arms for moving from a bucket loading to a bucket unloading position with respect to the arms, means for raising the arms to raise the bucket to its unloading position, said arm raising means including a pulley and cable system, said cable system including a cable exerting a force urging said pivoted portion of the bucket towards its bucket loading position as the arms are being hoisted, and means including a second cable for forcing the pivoted portion to its bucket unloading position against the opposing force of the first cable as said first cable raises the bucket beyond a predetermined position.

6. In combination with a motor truck, a truck loading structure including, a pair of side arms pivoted to the truck and extending rearwardly thereof, a load gathering bucket at the end of the arms, said bucket being swingable by the arms from a bucket loading position adjacent the ground to a bucket unloading position above the truck, said bucket including a back portion, at least the back portion being pivoted for movement with respect to the arms from a bucket loading position to a bucket unloading position, a hoisting cord for swinging the arms to the elevated bucket unloading position, said hoisting cord being arranged to force the back portion of the bucket towards its bucket loading position with respect to the arms as the hoisting cord is pulled to hoist the bucket, and means responsive to a predetermined movement of the bucket for swinging the bucket back portion towards its bucket unloading position against said closing force of the hoisting cord thereby causing gravity unloading of the bucket and whereby upon reverse movement of the side arms the force of the hoisting cord is again effective to force the back of the bucket to its bucket loading position with respect to the arms.

7. In combination with a motor truck, a truck loading structure including, a pair of side arms pivoted to the truck and extending rearwardly thereof, a load gathering bucket at the end of the arms, said bucket being swingable by the arms from a bucket loading position adjacent the ground to a bucket unloading position above the truck, said bucket including a back portion pivoted for movement with respect to the rest of the bucket from a loading position to a bucket unloading position, a hoisting cord for swinging the arms to the elevated bucket unloading position, said hoisting cord being arranged to force the back portion of the bucket towards its bucket loading position as the hoisting cord is pulled to hoist the bucket, and means responsive to a predetermined movement of the bucket for swinging the bucket back portion towards its bucket unloading position against said closing force of the hoisting cord thereby causing gravity unloading of the bucket and whereby upon reverse movement of the side arms the force of the hoisting cord is again effective to force the back of the bucket to its bucket loading position with respect to the arms.

8. A loading device for vehicles comprising a bucket, arms adapted to be pivoted to a vehicle and on which arms the bucket is mounted, said bucket including a shovel portion and a load back stop portion pivoted together, means for restraining pivotal movement of one portion with respect to the other during the bucket loading operation, and means responsive to a predetermined elevation of the bucket for causing pivoting movement of one portion with respect to the other to unload the bucket, said first named means comprising a hoisting cord for swinging the arms and hoisting the bucket, and said second named means comprising a cord secured to the pivoted portion of the bucket and to the vehicle at a point spaced from the pivot center of said arms and drawn taut by the swinging of said arms.

ALVA C. HENSLEY.

References Cited in the file of this patent

UNITED STATES PATENTS

| Number | Name | Date |
|---|---|---|
| 1,047,135 | Park | Dec. 10, 1912 |
| 1,359,841 | Russell | Nov. 23, 1920 |
| 1,733,969 | Knapp, Jr. | Oct. 29, 1929 |
| 2,019,451 | Harm | Oct. 29, 1935 |
| 2,138,200 | Whitmire | Nov. 29, 1938 |
| 2,208,205 | Biedess | July 16, 1940 |
| 2,327,473 | Wagner et al. | Aug. 24, 1943 |
| 2,394,830 | Woodin | Feb. 12, 1946 |
| 2,453,943 | Smith | Nov. 16, 1948 |
| 2,541,965 | Hensley | Feb. 13, 1951 |

FOREIGN PATENTS

| Number | Country | Date |
|---|---|---|
| 551,721 | Great Britain | Mar. 8, 1943 |